(12) United States Patent
Özden et al.

(10) Patent No.: US 11,702,882 B2
(45) Date of Patent: Jul. 18, 2023

(54) COMPRESSIBLE PILLAR FOR A VACUUM INSULATED GLAZING UNIT

(71) Applicant: VKR HOLDING A/S, Hørsholm (DK)

(72) Inventors: Utku Ahmet Özden, Hørsholm (DK); Annette Johncock Krisko, Prairie du Sac, WI (US); Simon Johnsen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 364 days.

(21) Appl. No.: 16/990,064

(22) Filed: Aug. 11, 2020

(65) Prior Publication Data

US 2021/0023619 A1    Jan. 28, 2021

Related U.S. Application Data

(63) Continuation of application No. PCT/DK2019/050047, filed on Feb. 7, 2019.

(30) Foreign Application Priority Data

Feb. 14, 2018 (DK) .............................. PA201870088
Feb. 14, 2018 (DK) .............................. PA201870091

(51) Int. Cl.
*E06B 3/663* (2006.01)
*B29C 64/153* (2017.01)
(Continued)

(52) U.S. Cl.
CPC .......... *E06B 3/66304* (2013.01); *B22F 10/00* (2021.01); *B29C 64/153* (2017.08);
(Continued)

(58) Field of Classification Search
CPC ....... B33Y 80/00; B29C 64/153; B22F 10/00; E06B 3/7334; E06B 3/6736;
(Continued)

(56) References Cited

U.S. PATENT DOCUMENTS 6,210,763 B1    4/2001   Katoh
6,420,002 B1    7/2002   Aggas
(Continued)

FOREIGN PATENT DOCUMENTS

EP    1018493 A1    7/2000
EP    1195496 A2    4/2002
(Continued)

OTHER PUBLICATIONS

European Search Report for corresponding application EP20194976; Report dated Jun. 1, 2021.
(Continued)

*Primary Examiner* — Moshe Wilensky
(74) *Attorney, Agent, or Firm* — Cantor Colburn LLP

(57) ABSTRACT

A compressible pillar for the preparation of a vacuum insulated glazing (VIG) unit, having a longitudinal extent in the pre-compressed state and including a deformable part having an open structure, which open structure will at least partially collapse when the pillar is subject to a compression force acting in the longitudinal direction of the pillar, the compression force being of at least one value selected within the range of 60 N to 320 N, the pillar will exhibit a partly irreversible deformation causing a reduction in the longitudinal extent of the pillar when the pillar is subjected to the compression force, so that when the compression force is fully released the pillar will exhibit an expansion in the longitudinal direction of the pillar which is less that the reduction in the longitudinal extent of the pillar. Further is shown a process for manufacturing of a compressible pillar, a method of producing a VIG unit as well as a VIG unit.

20 Claims, 12 Drawing Sheets

(51) Int. Cl.
  *B22F 10/00* (2021.01)
  *E06B 3/673* (2006.01)
  *E06B 3/677* (2006.01)
  *E06B 3/66* (2006.01)
  *B33Y 80/00* (2015.01)

(52) U.S. Cl.
  CPC ........... *E06B 3/67326* (2013.01); *B33Y 80/00* (2014.12); *E06B 3/6612* (2013.01); *E06B 3/6736* (2013.01); *E06B 3/6775* (2013.01); *E06B 3/67334* (2013.01); *Y10T 428/24628* (2015.01); *Y10T 428/24686* (2015.01)

(58) Field of Classification Search
  CPC ............... E06B 3/6775; E06B 3/66304; E06B 3/67326; E06B 3/6612
  See application file for complete search history.

(56) References Cited

U.S. PATENT DOCUMENTS

| | | |
|---|---|---|
| 6,479,112 B1 | 11/2002 | Shukuri |
| 9,103,161 B2 | 8/2015 | Mader |
| 10,533,366 B2 | 1/2020 | Ozden |
| 2002/0187299 A1 | 12/2002 | Jousse |
| 2013/0059087 A1 | 3/2013 | Veerasamy |
| 2013/0059160 A1 | 3/2013 | Veerasamy |
| 2015/0218877 A1 | 8/2015 | Kawahara |
| 2016/0174734 A1 | 6/2016 | Artwohl |

FOREIGN PATENT DOCUMENTS

| | | |
|---|---|---|
| EP | 1422204 A1 | 5/2004 |
| EP | 3210944 A1 | 8/2017 |
| WO | 0227135 A1 | 4/2002 |
| WO | 2004005783 A2 | 1/2004 |
| WO | 2011144588 A1 | 11/2011 |
| WO | 2014041409 A2 | 3/2014 |
| WO | 2017096050 A1 | 6/2017 |

OTHER PUBLICATIONS

European Search Report for corresponding application EP20194986; Report dated Jun. 1, 2021.
International Search Report for corresponding application PCT/DK2019/050047 filed Feb. 7, 2019; dated Apr. 11, 2019.

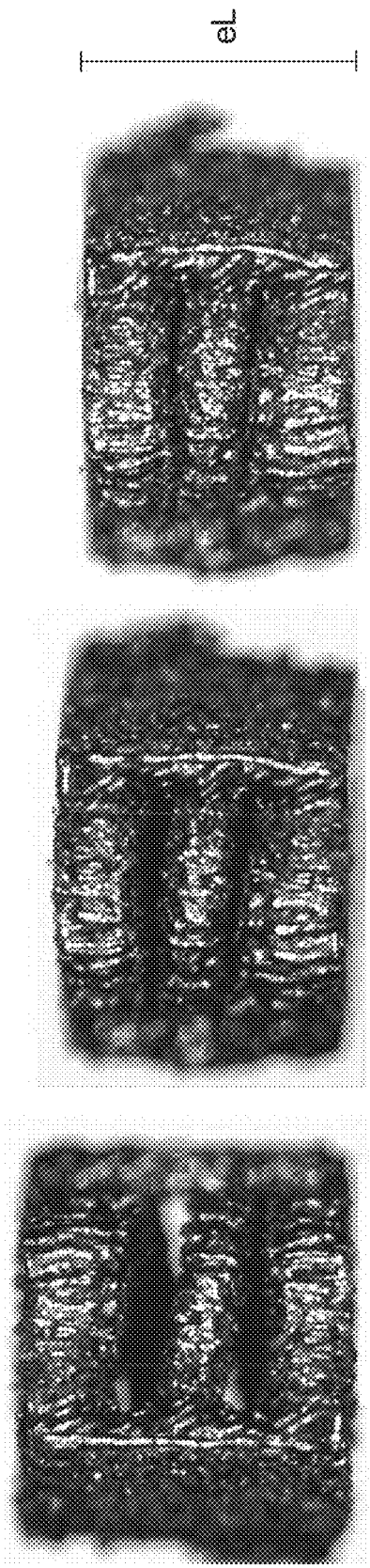

Total = 140

Collected = 137

Toppled on the side = 11

Measured = 124

Un-able to measure = 2

COMPRESSIBLE PILLAR FOR A VACUUM INSULATED GLAZING UNIT

CROSS REFERENCE TO RELATED APPLICATIONS

This application is a continuation of International Patent Application Number PCT/DK2019/050047 which was filed on Feb. 7, 2019 claiming priority to Danish Patent Application Numbers PA201870091 and PA201870088, both of which were filed on Feb. 14, 2018, where the entire contents of all of said applications are incorporated herein by reference.

TECHNICAL FIELD

The invention relates to a compressible pillar for a vacuum insulated glazing (VIG) unit, a process of manufacturing such pillar, a method of producing a VIG-unit including such pillars and a VIG-unit comprising such pillars.

BACKGROUND

Vacuum insulated glazing (VIG) units comprise a void between two glass panes which have been evacuated to create a pressure near vacuum. This low pressure void in turn results in a large pressure asserted on each glass pane towards the void. Pillars, also known as spacers, are used in VIG units to maintain the void thickness and the distance between the glass panes and it is therefore a requirement that these pillars comprise a high compressive strength and are capable of withstanding the pressures exerted on them from outside the VIG unit by the atmospheric pressure on the external side of the glass panes such that the void is maintained. Not only is it desirable to have pillars which comprise a high compressive strength, but also pillars which can allow a certain degree of shear as the glass panes move relatively to each other in a direction parallel to the extent of the glass panes, which for example occurs due to thermal expansion especially when the VIG unit is installed and in use and due to wind pressure on one side of the VIG unit. Similarly, it is also of advantage having pillars which can relieve any stresses occurring in the glass panes due e.g. to an impact force applied to the glass panes in a direction perpendicular to the glass surface.

Tempered glass panes has the advantage of being of higher strength than regular glass panes but the disadvantage of comprising larger surface irregularities than regular glass panes. Tempered glass panes generally comprise flatness deviation resulting from the toughening process, such as roller wave distortion which occurs when the soft glass is in contact with rollers in a horizontal toughening process. The distance between two tempered glass panes may therefore vary significantly across the panes.

Additionally is generally favourable that the insulating property and the transparency of the VIG unit are not significantly affected by the pillars, preferably the visibility of the pillars as well as their conductive properties are minimized.

EP patent application no. EP 1 018 493 A1 describes a number of different pillars for a vacuum insulated glass panel, including pillars of fixed and variable height. E.g. a pillar is described having two planar contacting faces abutting the glass panes and comprising an elastic member in between, in the form of e.g. a spring, an open structure, or elastically deformable material. The pillars are described as being adapted to account for displacements of the panes along and perpendicular to the glass surfaces, such as tempered glass surfaces.

U.S. Pat. No. 6,479,112 describes a glass panel having two glass panes, such as tempered glass panes, separated at pre-determined distance using pillars having a contact surface facing the inner surface of one of the glass panes which comprises protrusion. The pillars are made to a pre-determined height using hard materials such as metal or solder glass. In one embodiment, the pillars may alternatively be made of rubber, such as synthetic resin rubber, allowing the pillar to be flexible and absorb any flexural movement of the panes.

U.S. Pat. No. 6,210,763 describes a pillar, e.g. of cylindrical shape and made of aluminium alloy, capable of maintaining a predetermined distance between two glass panes, such as tempered glass panes, and at the same time be able to relieve stress due to impact through plastic deformation in the pillar.

European patent application EP 3 210 944 A1 discloses a vacuum glass panel having two glass panes, where in order to compensate for surface undulation of the panes, pillars with corresponding heights are arranged on corresponding positions between the layers of plate, and the heights of the pillars match with the spacing between the glass panes at corresponding positions in the vacuum glass panel, so that each pillar can be clamped by the upper and the lower pane and effectively plays a supporting role.

BRIEF SUMMARY

The present invention relates in a first aspect of the invention to a compressible pillar for the preparation of a vacuum insulated glazing (VIG) unit, the pillar having a longitudinal extent in the pre-compressed state and comprising a deformable part having an open structure, which open structure will at least partially collapse when the pillar is subject to a compression force acting in the longitudinal direction of the pillar, the compression force being of at least one value selected within the range of 60 N to 320 N such as a value of the compression force being selected from the range of 60 N to 140 N, from the range of 140 N to 230 N, or from the range of 230 N to 320 N, the pillar will exhibit a partly irreversible deformation causing a reduction in the longitudinal extent of the pillar when the pillar is subjected to said compression force, so that when said compression force is fully released the pillar will exhibit an expansion in the longitudinal direction of the pillar which is less that said reduction in the longitudinal extent of the pillar.

By the term "open structure" is herein understood a structure having voids or open cavities, which will be at least partly occupied by the material of the structure as the structure at least partially collapses when the compression force is applied.

Irreversible deformation is a non-elastic deformation that may include plastic deformation of the material and possible strain hardening of the pillar. The deformation of the pillar will be partly irreversible and will comprise of elastic deformation, which is reversible and causes the expansion of the pillar when the compression force is released, as well as irreversible deformation of the pillar for which reason the expansion in the longitudinal direction of the pillar is less than the reduction when the pillar is subjected to the compression force. The compressible pillar may be subjected to compression forces of different magnitudes, depending e.g. on the mutual spacing between neighbouring pillars, which depending on the VIG-unit may be from e.g.

25 mm to 50 mm or more. Thus, the pillars may be designed to undergo the partly irreversible deformation within a suitable range of compression forces, which at least partly is included in the range given as 60 N to 320 N, so that one design of pillars according to the embodiment may undergo the partly irreversible deformation at a compression force of 280 N but only elastic deformation at a force of only 100 N, whereas another design of pillars according to the embodiment will undergo the partly irreversible deformation at a compression force of 65 N.

With this compressible pillar is obtained that deviations from evenness of the two glass panes that constitute a VIG-unit may be compensated by the pillars, which allow for a corresponding variation in the distance between the inner surfaces of the two glass panes of the VIG-unit. The partly irreversible deformation of the pillars will cause the forces between the pillars and glass panes of the VIG-unit at the points of contact between the pillars and the glass panes to be much more homogeneous than is achieved with VIG-units having pillars that deform purely elastically during evacuation of the void of the VIG-unit, in which case the forces are minimal where the distance between the glass panes were largest prior to the evacuation and maximal where the distance between the glass panes were smallest prior to the evacuation of the void.

The pillars are preferably heat resistant to a temperature of at least 200° C., preferably to at least 300° C. in order to allow for heating of the VIG-unit during manufacturing thereof, so that the physical properties of the pillars are preserved after heating and subsequent cooling to ambient temperature, i.e. to 20° C. In certain manufacturing procedures, the VIG-unit is heated even more, and it may be advantageous that the pillars are heat resistant to a temperature of 380° C. or even to a temperature as high as 500° C.

More particularly, it is preferred that the pillar, when said compression force is released will expand in the longitudinal direction of the pillar with a relative expansion in the longitudinal direction of the pillar in the range of 0.5% to 50% of the relative reduction, preferably in the range of 1% to 35% of the relative reduction, such as in the range of 2% to 25%. The expansion in the longitudinal direction is a measure of the elastic deformation included in the partly irreversible deformation of the pillars according to the present invention, where a certain amount of elasticity is required for pillar to remain in place in the VIG-unit during deformations of the VIG-unit due to thermal expansion, wind load on the VIG-unit or impact of objects on the VIG-unit, which preferably is intended for use as part of a window in a building.

The relative reduction in the longitudinal extent of the pillar when the pillar is subjected to said compression force can be modelled as being equal to a compression factor (C) times the compression force. It is preferred that the compression factor (C) is in the range of $0.8 \cdot 10^{-3}$ $N^{-1}$ to $5.0 \cdot 10^{-3}$ $N^{-1}$, preferably in the range of $1.0 \cdot 10^{-3}$ $N^{-1}$ to $4.0 \cdot 10^{-3} N^{-1}$.

The compression factor C is used to define the relative compression of the pillar as a function of the compression force. Thus, with $C=2 \cdot 10^{-3}$ $N^{-1}$ and a compression force F=150 N, the relative reduction of the longitudinal extent of the pillar will be $\Delta L$, red/L0=C·F=$2 \cdot 10^{-3}$·150=30% of the longitudinal extent prior to compression.

The longitudinal extent of the pillar in the pre-compressed state is preferably within the range of 0.2 mm to 1.2 mm, more preferably in the range of 0.3 mm to 0.8 mm, such as in the range of 0.4 to 0.7 mm.

The open structure of the pillar is preferably made from metal, in particular of a metal having compressive yield strength higher than 1 GPa at 20° C. The compressible pillar may e.g. be made from a metal which is an austenitic nickel-chromium-based superalloy. Other metals that may be employed include pure nickel (Ni) which by means of defect hardening may so as to reach at yield strength higher than 1 GPa. Also, low carbon austenitic chromium-nickel stainless steels like type SS 301, SS 304, SS 308 and SS 316 may alternatively be employed. These stainless steel types are normally soft with a lower compressive yield strength, which may be increased by hardening of the material by cold working of the pillar prior to compression thereof. Thus, SS 301 may by cold working obtain yield strength in the range of 1.6-1.9 GPa and SS 304 may obtain compressive yield strength of 1.35 GPa. Another alternative material for the pillars is high-carbon martensitic steels like the 440C series which can be hardened by heat treatment to a sufficient degree so at to reach a compressive yield strength higher than 1 GPa at 20° C. Tool steels in general may also be used for the manufacture of pillars, which include: unalloyed tool steels with small amounts of tungsten (W, wolfram), such as C45W, C70W and C85W, low alloy cold work tool steels like 100Cr6 and alloy cold work tool steels like X 210 Cr 12, X 155 CrVMo 12 1 and X 36 CrMo 17. In tool steels hardness may be also influenced by heat treatment, such as quenching and subsequently tempering, but generally they are sufficiently hard due to the carbon content with compressive yield strength prior to compression of the pillars of higher than 1 GPa.

The pillars as described herein may be manufactured by a number of different manufacturing technologies of which some are discussed here. One group of technologies includes employing additive manufacturing technology to a metal powder bed by means of selective employment of laser light to fuse particles of the metal powder. The fusion of particles may include the melting of particles in a method known as Selective Laser Melting, (SLM), and/or may include the sintering of particles in a method known as Selective Laser Sintering (SLS) or Micro Laser Sintering (MLS).

Another manufacturing technology for pillars is cutting or carving material away from a solid metal object by means of laser light or by means of Electric Discharge Machining (EDM) in order to obtain the requested shape of the pillar.

Pillars may also be formed by means of an additive manufacturing technology known as electrodeposition process in a so-called electroforming process of the pillar. Electroforming is the metal forming process where metal is grown by electrodeposition onto a substrate. An electrolytic bath is used to deposit the metal onto a conductive patterned surface, e.g. formed by means of a non-conductive mask applied to a conductive surface.

The compressible pillar has in one preferred embodiment a deformable part with an open structure that comprises a coil, e.g. in the form of a helix. The deformable part of the pillar may alternatively comprise a double helix structure. If the integrity of one of the helix structures fails during compression the other helix structure represent another option for the pillar to maintain a certain degree of elasticity for accommodation any local variations in distance between the glass panes. According to a second preferred embodiment, the pillar is formed with a substantially uniform cross-section in parallel planes perpendicular to first and second end surfaces of the pillar arranged on first and second ends structures, respectively, wherein the first end structure, the second end structure and the open structure form a cross-section in said parallel planes of essentially the shape of a capital sigma ($\Sigma$).

The windings of such coils have preferably an extent in the longitudinal direction of the pillar in the range of 0.05 to 0.2 mm, preferably in the range of 0.065 to 0.15 mm.

The height of the windings of the coil and the height of the first and second end structures are not necessarily uniform about the longitudinal axis of the pillar, for example the height of the element may not be readily apparent at contact points where the coil merges with the first end structure at one end and at contact points where the coil merges with the second end structure. The average height is generally calculated without including the height measurements at these points. Due to the manufacturing method of these pillars and the small scale on which these are made, the pillars may comprise a surface roughness which also affects the heights measured. The heights measured are therefore the average heights determined from microscopic images.

The pillar comprises preferably furthermore a first end structure and a second end structure having a first and a second substantially plane end surface, respectively, for abutting with the glass panes of the VIG-unit, which end surfaces extend substantially in parallel. The collapsible deformable part having an open structure extends between the first end structure and the second end structure.

The first end structure and the second end structure each have an extent in the longitudinal direction of the pillar in the range of 0.025 to 0.1 mm, preferably in the range of 0.04 to 0.075 mm. The dimensions of the end structures of the pillar may be adjusted and reduced in a post-processing procedure after the manufacturing of a pillar element by e.g. micro laser sintering of a metal powder or selective laser melting (SLM) or another of the manufacturing processes discussed herein, where the end structures are e.g. machined, polished or otherwise processed to become plane. A reduction of the thickness, i.e. the longitudinal extent of the first and second end structures may be useful in obtaining a final design of the pillar that in a compressed state may be sufficiently small to allow for the distance between the two glass panes of the VIG-unit to become low when the void of the VIG-unit has been evacuated, such as 0.2 mm or even as low as 0.1 mm.

Said first and second substantially plane end surfaces have preferably each an area in the range of 0.1 to 0.3 square millimetres.

The open structure of the pillar is preferably formed so that the first end structure and the second end structure will be mutually displaces towards each other substantially only in the longitudinal direction of the pillar when the pillar is subjected to said compression force acting in the longitudinal direction of the pillar.

The pillar is in the compressed state susceptible to shear strain when exposed to a shear force between substantially parallel and substantially plane end surfaces of the pillar suitable for being in abutment with the surfaces of the panes of a VIG unit, the shear strain being a shear factor time the ratio of the shear force to the average area of the first and second substantially plane end surfaces, wherein the shear factor preferably is less than 55 GPA, preferably in the range of 10 to 50 GPa, such as 18 to 40 GPa, for shear forces less than 100 N.

With the term "in the compressed state" is herein understood that the pillar is subjected to a compressing force acting on the pillar in the longitudinal direction thereof.

According to a second aspect, the present invention relates to a compressible pillar for the preparation of a vacuum insulated glazing (VIG) unit, having a longitudinal extent in the pre-compressed state and comprising a deformable part having an open structure, which open structure will at least partially collapse when the pillar is subject to a compression force acting in the longitudinal direction of the pillar, the compression force being of at least one value selected within the range of 60 N to 320 N such as a value of the compression force being selected from the range of 60 N to 140 N, from the range of 140 N to 230 N, or from the range of 230 N to 320 N, so that the pillar will exhibit a deformation causing a reduction in the longitudinal extent of the pillar when the pillar is subjected to said compression force, the pillar comprises a first end structure and a second end structure having a first and a second substantially plane end surface, respectively, for abutting with the glass panes of the VIG-unit, which end surfaces extend substantially in parallel, wherein the open structure of the pillar connects the first end structure and the second end structure, and wherein the pillar is formed with a substantially uniform cross-section in parallel planes perpendicular to the first and the second end surfaces.

The deformable part of the pillar according to the second aspect comprises preferably two structures separately connecting the first end structure and the second end structure.

It is further preferred that each of said structures comprises a first element extending from the first end structure towards the second end structure at a first slanted angle to the longitudinal direction of the pillar and a second element extending from the second end structure towards the first end structure at a second slanted angle to the longitudinal direction of the pillar, the first and the second slanted angles being of substantially the same magnitude, such as in the range of 15 to 60° so that the first element and the second element are slanted in opposite directions.

Furthermore, the first element and the second element of each of said structures of the deformable part of the pillar may be joined in a joining part of the deformable part, wherein the joining part is formed with a partly annular cross-section with a curved transition to the first and second elements.

In a particularly preferred embodiment of the second aspect of the present invention, the first end structure, the second end structure and the deformable part form a cross-section in said parallel planes of essentially the shape of a capital sigma ($\Sigma$). In an even more preferred embodiment, the first end structure, the second end structure and the deformable part form a cross-section in said parallel planes of essentially the shape of a capital sigma ($\Sigma$) joined with a mirrored capital sigma.

The shape of the capital sigma, which could also be seen as a capital M comprises two substantially parallel end structures connected by an open structure, which when the pillar is subjected to a compression force in the longitudinal direction of the pillar will collapse substantially solely in the longitudinal direction in a manner that allow the two end structures to remain being parallel and substantially without displacing the end structures in a direction perpendicular to the longitudinal direction of the pillar.

The pillars are preferably heat resistant to a temperature of at least 200° C., preferably to at least 300° C. in order to allow for heating of the VIG-unit during manufacturing thereof, so that the physical properties of the pillars are preserved after heating and subsequent cooling to ambient temperature, i.e. to 20° C.

In a particular embodiment of the pillar, the shape may include a "double-sigma" with a capital sigma joined with a mirrored capital sigma. However, it is preferred that the shape comprises of one capital sigma only as such shape is more easy to manufacture on the scale of a pillar for a VIG-unit.

The open structure comprises in a preferred embodiment of the second aspect a first element extending from the first end structure towards the second end structure at a first slanted angle to the longitudinal direction of the pillar and a second element extending from the second end structure towards the first end structure at a second slanted angle to the longitudinal direction of the pillar, the first and the second slanted angles being of substantially the same magnitude so that the first element and the second element are slanted in opposite directions.

In a preferred embodiment, the first element and the second element of the deformable part of the pillar are joined in a joining part of the open-structured, deformable part of the pillar, wherein the joining part is formed with a partly annular cross-section with a curved transition to the first and second elements, e.g. as shown and discussed below with reference to FIG. 8a.

The compressible pillar of the second aspect of the present invention may include any of the features of the first aspect as disclosed above.

The present invention relates in a third aspect to a process of manufacturing of a compressible pillar, in particular ones with mechanical features as disclosed herein for the preparation of a vacuum insulated glazing (VIG) unit, applying an additive manufacturing technology to a metal powder bed by means of selective employment of laser light to fuse particles of the metal powder.

The fusion of particles may include the melting of particles in a method known as Selective Laser Melting, (SLM), and/or may include the sintering of particles in a method known as Selective Laser Sintering (SLS) or Micro Laser Sintering (MLS).

It is preferred that in the process the fusion of the particles of the metal powder is conducted repetitively to consecutive layers of the metal powder. During manufacturing, a thin layer of metal powder is applied to a build platform. The powder is selectively fused by a laser beam according to each cross section. After that the building platform is lowered, the procedure of powder coating, fusing and platform lowering is repeated layer by layer, until the part is completed.

It is particularly preferred that the process comprises the step of providing the pillar with a first end structure and a second end structure having a first and a second substantially plane end surface, respectively, for abutting with the glass panes of the VIG-unit, which end surfaces extend substantially in parallel, wherein the first end structure and the second end structure each have an extent in the longitudinal direction of the pillar in the range of 0.025 to 0.1 mm, preferably in the range of 0.04 to 0.075 mm. In particular, such process may include that the first end structure and the second end structure are processed after the additive manufacturing technology has been applied to obtain said extent in the longitudinal direction of the pillar. The end parts structure may be e.g. machined, polished or otherwise processed to become plane. A reduction of the thickness, i.e. the longitudinal extent of the first and second end structures may be useful in obtaining a final design of the pillar that in a compressed state may be sufficiently small to allow for the distance between the two glass panes of the VIG-unit to become low when the void of the VIG-unit has been evacuated, such as 0.2 mm or even as low as 0.1 mm.

According to a fourth aspect, the present invention relates to a method of producing a vacuum insulated glazing (VIG) unit comprising the steps of:
providing a first and second substantially parallel panes of glass and a plurality of compressible pillars as disclosed herein with respect to the first and the second aspect of the present invention provided between the first and second panes to ensure a minimum distance between the panes,
forming a void between the first and the second panes and a peripheral seal, and
evacuating the void whereby the pillars are compressed between the first and the second pane.

The method may further comprise the step of applying an external force to at least one of the first and the second panes so as to forcing the panes towards each other and thereby compressing the pillars. The external force may be provided by means of clamps or by evacuating the void so that the surrounding gas pressure, such as the atmospheric pressure, will exert an external force on the panes.

The transversal distance between neighbouring pillars in the VIG-unit according to the present invention is preferably in the range of 15 to 50 millimetres, more preferably in the range of 30 to 45 millimetres.

Said first and second substantially parallel panes are preferably made from tempered glass.

An evacuation hole is preferably provided in an outer surface of the first pane. Alternatively, an evacuation hole of a suitable kind may be provided in the peripheral seal between the two glass panes. The void is evacuated through the evacuation hole, where after the evacuation hole is sealed off.

The peripheral seal is preferably provided as a deformable solder material, wherein the first and second panes are in gastight contact with the material of the peripheral seal so as to form the void.

The material of the peripheral seal comprises in a preferred embodiment of the invention a solder glass frit.

The void may be is evacuated to a pressure of 0.01 millibar or less, preferably to 0.001 millibar or less prior to sealing off the evacuation hole.

The method may comprise the step of heating the VIG unit to a temperature of at least 250° C., preferably to at least 300° C. prior to sealing off the evacuation hole.

The present invention relates in a fifth aspect to a vacuum insulated glazing (VIG) unit comprising
a first and second substantially parallel panes of glass and a plurality of compressible pillars as disclosed herein with respect to the first and the second aspect of the present invention provided between the first and second panes the pillars being compressed between the first and the second pane,
a void formed between the first and the second panes and a peripheral seal, wherein the void is evacuated.

The expansion of the pillars of a VIG-unit when the compression force is fully released may be detected by means of obtaining a measure of the change in longitudinal extent of a plurality of pillars in a VIG-unit when the ambient air pressure of the VIG-unit is reduced from atmospheric pressure to a pressure, where the pillars are substantially free of compression force, such as a pressure corresponding to the one inside the void. The measure may be obtained as a distance between the outer surfaces of the first and second panes of glass at the position of the given pillar or as the actual longitudinal extent of the pillar, which may be determined by means of optical measurement, such as by reflecting laser light in the surfaces of the two glass panes. A subsequent microscope examination of the structures of the pillars may be applied to determine irreversible deformation and possible strain hardening of the pillars, in particular of the open structure part, i.e. the deformable part of the pillars.

The transversal distance between neighbouring pillars in the VIG-unit is preferably in the range of 15 to 50 millimetres, preferably in the range of 30 to 45 millimetres.

The first and second substantially parallel panes of the VIG-unit are preferably made from tempered glass.

The peripheral seal of the VIG-unit is preferably provided as a deformable solder material and wherein the first and second panes are in gastight contact with the material of the peripheral seal so as to form the void.

The material of the peripheral seal comprises preferably a solder glass frit.

The void of the VIG-unit is preferably evacuated to a pressure of 0.01 millibar or less, preferably to 0.001 millibar or less.

The present invention furthermore relates to a window or door comprising the VIG-unit according to the present invention or as VIG-unit prepared by means of the method disclosed herein.

The VIG units are preferably made using tempered glass panes, which generally comprise a significant flatness deviation resulting from the toughening process, such as roller wave distortion which occurs when the soft glass is in contact with rollers in a horizontal toughening process. When two glass panes are arranged in parallel, above one another, the distance between two tempered glass panes may vary significantly across the panes, so that pillars, such as pillars of different pillar heights might need to be applied in order to properly maintain the void.

BRIEF DESCRIPTION OF THE DRAWINGS

Aspects of the present disclosure will be described in the following with reference to the figures in which:

FIG. 8a illustrates the pillar of FIG. 7 in a pre-compressed state, FIGS. 8b-c illustrates the pillar of FIG. 8a in a compressed state.

DETAILED DESCRIPTION

Figure 1A:
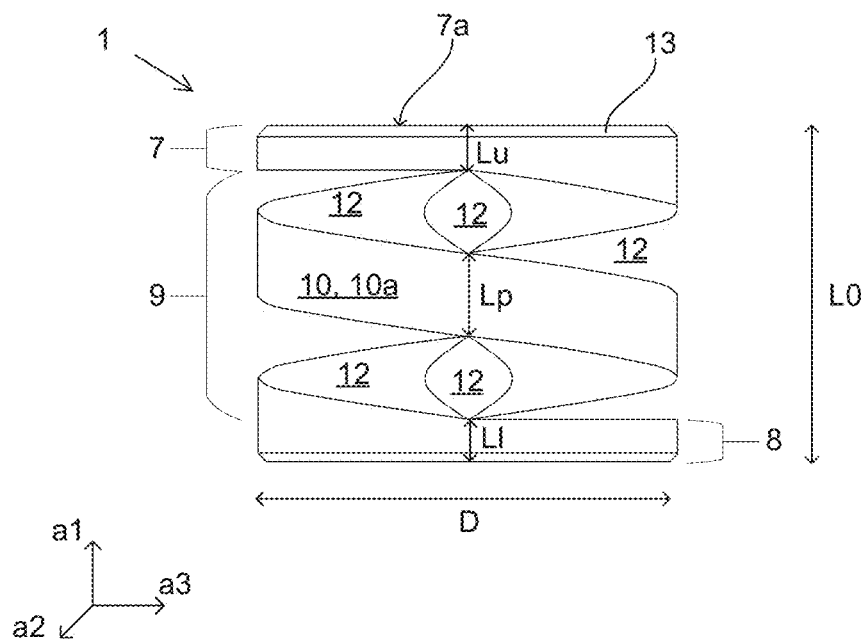
FIG. 1a illustrates a side view of a pre-compressed first pillar for use in a VIG unit, where the pillar comprises a coil-shaped part.

The present invention relates to a pillar 1 for providing and maintaining a distance between a first glass pane 3a and a second glass pane 3b in vacuum insulated glazing (VIG) unit 2 as shown in FIG. 5. The glass panes 3a, 3b are placed in a face-to-face configuration, such that a void 5 is created by arranging a peripheral seal 6 around the edges, between the glass panes 3a, 3b. Each glass pane 3a, 3b in the VIG unit 2 comprises an inner surface 4a, 4b and outer surface where the inner surfaces 4a, 4b is characterised as the surfaces facing the void 5. Ideally the void gap, i.e. the distance between the glass panes 3a, 3b in the VIG unit 2 is uniform, but during the production of glass panes, the resulting glass panes 3a, 3b may not comprise completely planar pane surfaces. The surface variation may depend on the quality of the glass panes 3a, 3b and the manufacturing method used to make the glass panes 3a, 3b e.g. tempered glass panes in general comprise relatively large surface variations across the pane. The glass panes 3a, 3b may be orientated and aligned in different ways, but generally regardless of the configuration of the panes, the void height i.e. distance between the glass panes 3a, 3b, will be non-uniform in the VIG unit 2.

In the present examples the VIG units 2 are made using tempered glass panes 3a, 3b, which generally comprise a significant flatness deviation resulting from the toughening process, such as roller wave distortion which occurs when the soft glass is in contact with rollers in a horizontal toughening process. When two glass panes 3a, 3b are arranged in parallel, above one another, the distance between two tempered glass panes 3a, 3b may vary significantly across the panes, so that pillars 1, such as pillars 1 of different pillar heights might need to be applied in order to properly maintain the void 5.

FIG. 1a illustrates a pillar 1 according to embodiments of the invention, seen from the side. The pillar 1 can be viewed as comprising three parts, an upper part 7 and lower part 8 which are similar and a middle part 9.

Figure 1B:
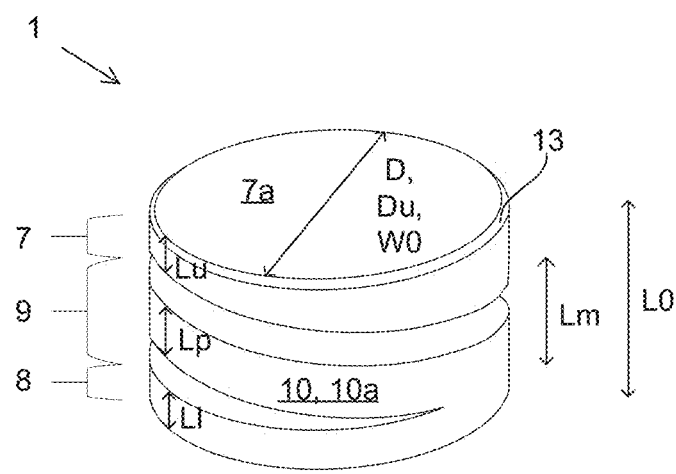
FIG. 1b shows a perspective view of the pillar of FIG. 1a, FIG. 1c illustrates a side view of the pillar of FIG. 1a, which is in the compressed state.

The upper part 7 comprises a top contact surface 7a and the lower part 8 comprises a bottom contact surface 8a, both contact surfaces 7a, 8a are generally disc-shaped and configured to face an inner surface 4a, 4b of the one of the glass panes 3a, 3b of the VIG unit 2 when the pillar 100 is placed in the void 5. FIG. 1b shows the pillar as seen in perspective. As shown in the figure, the contact surface 7a, 8a is substantially planar, such that a large area of the contact surface 7a, 8a is in contact with the glass pane 3a, 3b and thereby the force on the glass pane is distributed over preferably an area similar to the extent of the contact surface 7a, 8a.

Figure 1C:
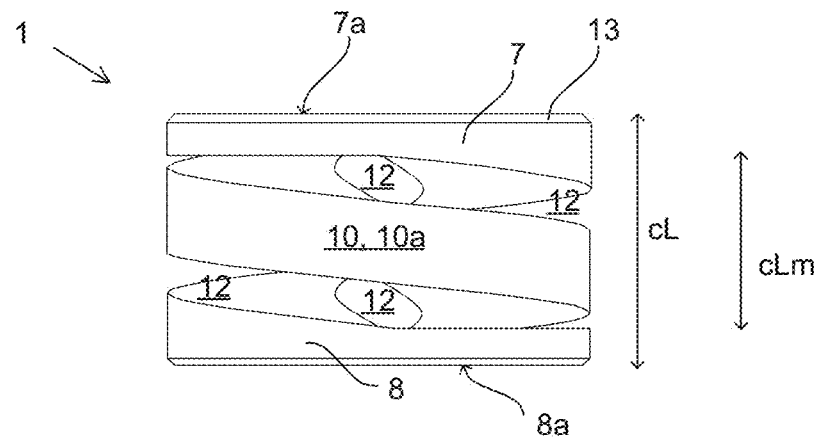
FIG. 1d illustrates a side view of the pillar of FIGS. 1a-c, which is in a further compressed state.
FIG. 1e illustrates a side view of a compressed second pillar for use in a VIG unit, where the pillar comprises a coil-shaped part.
FIGS. 1f-g shows two details of the pillar of FIG. 1a, FIGS. 2a to 2d shows cross-sectional side views of four different embodiments of pre-compressed pillars for use in a VIG unit, where the pillars comprises a coil-shaped part.
Figure 1D:
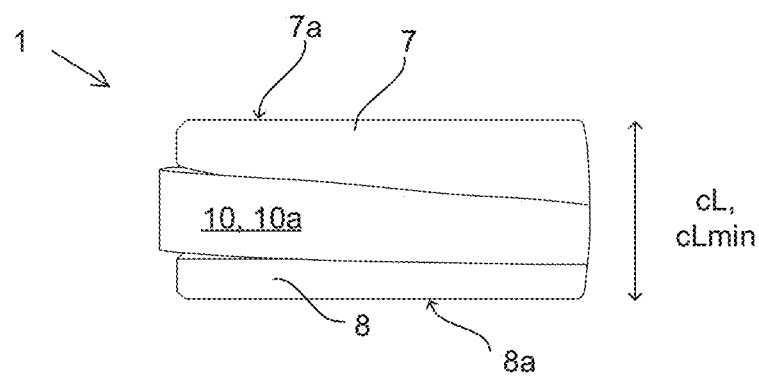
Figure 1E:
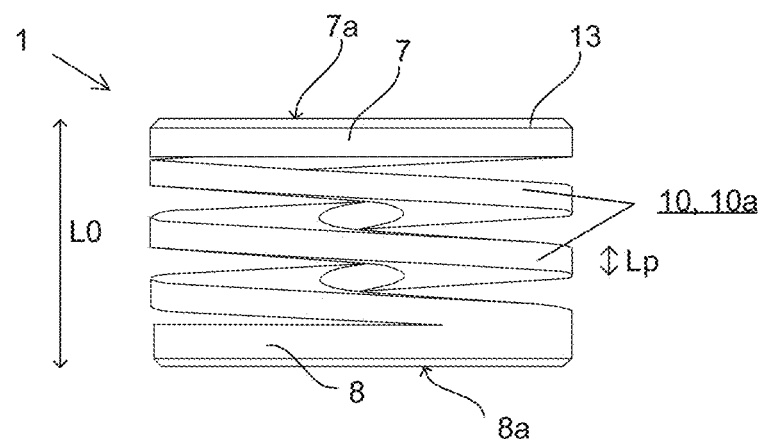
Figure 1F:
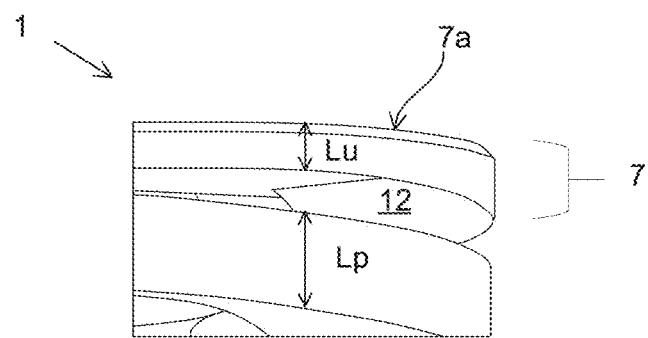
Figure 1G:
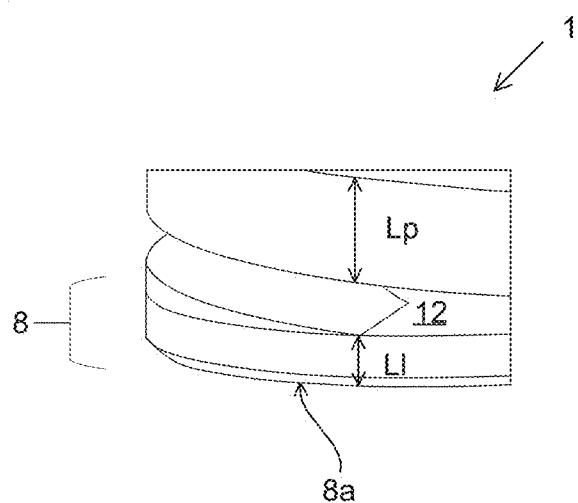

In the examples of a pillar as shown in FIGS. 1a-g, the middle part 9 of the pillar 1 is compressible and generally shaped as a coil shaped or helix structure 10. The helix structure 10 shown in FIGS. 1a-d comprises a helix flight 10a making a single space curve revolution about a first axis (a1). The first axis (a1) is preferably orientated perpendicular to the extent of the upper and lower contact surfaces 7a, 8a as indicated in FIG. 1a. FIG. 1e shows a helix flight 10b making a double space curve revolution about the first axis (a1). Due to the helix structure 10, the middle part 9 is an open structure having open zones 12 such as between different parts of the helix structure 10 and between the helix structure 10 and the upper 7 and lower part 8 of the pillar 1.

The thickness (T0) and the width (W0) of the pillar 1 are measured along a second axis (a2) and a third axis (a3) respectively. Both the second axis (a2) and the third axis (a3) are orientated perpendicular to the first axis (a1) and to each other, as shown in FIG. 1a. In the present example, the pillar 1 has a substantially circular cross-section in the plane defined by the second (a2) and third axis (a3) and the pillar 1 is substantially uniform in width (W0) and thickness (T0) along the first axis (a1). In the present examples shown in FIGS. 1a-g, the width (W0) is equal to the thickness (T0) and the cross-section is of a pillar diameter (D) which is approximately 0.5 mm, which is also the diameter of the top contact surface (Du) and bottom contact surfaces (Dl). In one or more examples, the cross-section may be of a different shape, such as elliptical, square or an arbitrary shape.

The height of the pillar 1 and the height of different parts and elements of the pillar 1 are all measured along a direction parallel to the first axis (a1). The initial height of the pillar (L0) is determined by the sum of the height of the upper part (Lu), the height of the lower part (Ll) and the height of the middle part (Lm) in their initial, un-biased configuration. In the present example, the heights of the upper (Lu) and lower part (Ll) are approximately equal and are about 0.05 mm. The middle part 9 initially extends to a height (Lm) of approximately 0.5 mm. More generally, the deformable part (9) has a height (Lm) within the range of 0.1 to 11 mm, such as 0.2 to 0.7 mm, preferably in the range of 0.3 to 0.6 mm. When the pillar 1 is biased by pressure directed mainly perpendicular to the contact surfaces 7a, 8a, the pillar 1 will decrease in height, defined as the compressed longitudinal extend of the pillar (cL), mainly due to compression of the middle part 9. Since the middle part 9 has an open structure due to the open zones 12 it is possible to compress the helix structure 10 and thereby decrease the occurrence of open zones 12 in the helix structure 10, such that the height of the middle part (Lm) is decreased to a compressed height of the middle part (cLm). The compression of the middle part 9 and thereby the pillar 1 as seen from the side is illustrated in FIGS. 1c-d. Compression of the remaining parts of the pillar 1 may also occur. The overall reduction in the longitudinal extend of the pillar height (ΔL, red) is a measured of the difference between the original longitudinal extend of the pillar in a pre-compressed state (L0) and the longitudinal extend of the pillar in the compressed state (cL).

The minimum compressed pillar height (cLmin) is dependent on the amount of open zones 12 and the amount helix structure 10 present in the middle part. The minimum height (cLmin) can be calculated by first calculating the height of the helix flight (Lp) times the amount of helix flights 10a the helix structure 10 comprises, and then add this calculated height to the height of the upper (Lu) and lower disc-shaped parts (Ll). Preferably the minimum compressed height (cLmin) should be approximately the height of the pre-estimated minimum distance between the glass panes 3a, 3b. For the present example, the minimum distance is considered to be around 0.2 mm. Generally, the minimum compressed height (cLmin) is within the range of 0.1 to 0.5 mm, preferably in the range of 0.15 to 0.3 mm. It may still be possible for the pillar height to decrease beyond this estimated minimum distance e.g. due to the compressibility of the pillar material or due to redistribution of pillar material in the direction along the third (a3) and second axis (a2). A helix structure 10 comprising a larger amount of flights 10a as shown in FIG. 1e may in turn comprise a smaller height of each flight (Lp) in order to maintain a minimum compressed height (cLmin) of the pillar 1 around 0.2 mm.

The height of the pillar (L0) (cL), (cLmin), (eL) and pillar elements thereof e.g. heights of helix flights 10a (Lp), height of upper part of pillar (Lu) and height of lower part of pillar (Ll) is understood as the average height of the measured element. There exist minor geometrical mismatches in the pillar 1, where the height of the element may not be readily determined. The height of the helix flight (Lp) of the helix structure 10, and the height of the upper (Lu) and lower parts (Ll) are not necessarily uniform about the first axis (a1), for example the height of the element may not be readily apparent at contact points where the helix structure 10 merges with the upper part 7 at one end and at contact points where the helix structure 10 merges with the lower part 8 at a second end as visualised in FIG. 1f and FIG. 1g respectively. The average height is generally calculated without including the height measurements at these points. Due to the manufacturing method of these pillars 1 and the small scale on which these are made, the pillars 1 may comprise a surface roughness which also affects the heights measured. The heights measured are therefore the average heights determined from microscopic images.

Figure 2A:
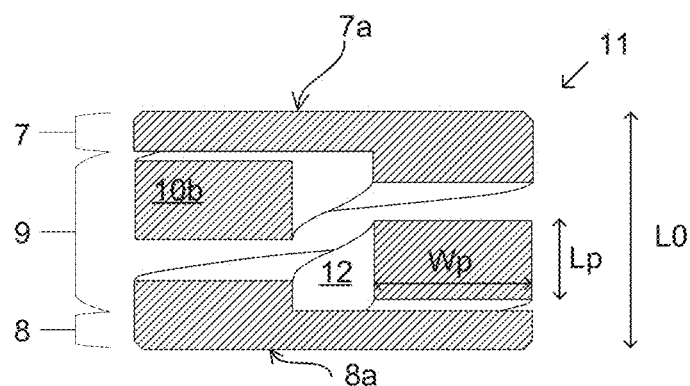
Figure 2B:
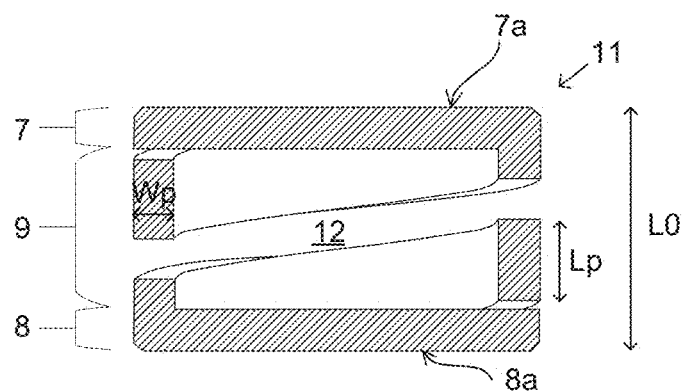
Figure 2C:
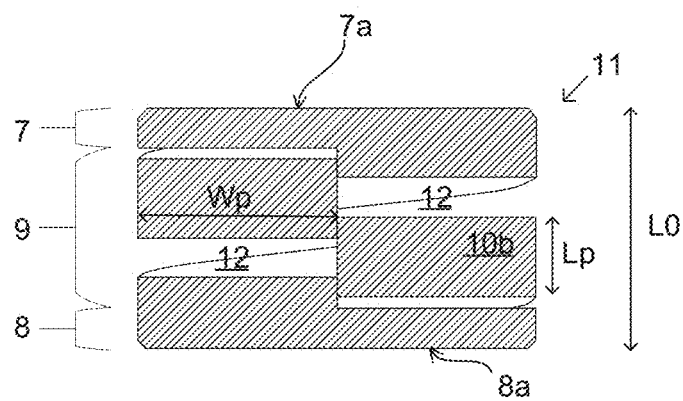
Figure 2D:
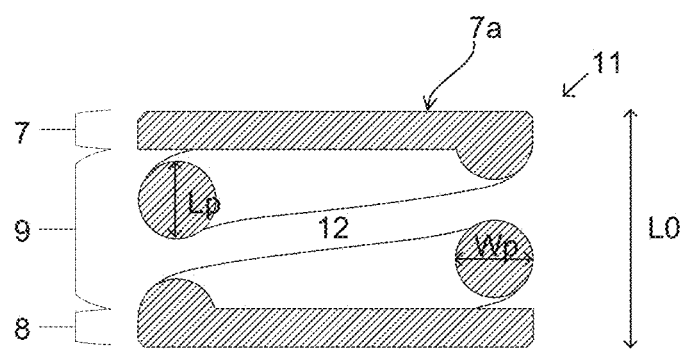

The profile of the helix flight 10b may comprise any shape suitable for the function of the pillar 1. In the present examples shown in FIGS. 1a to 1g, the profile of the helix flight 10b is rectangular-shaped with a radial extent i.e. a width (Wp) larger than the longitudinal extend i.e. the height of the helix flight (Lp). In the present example, the width (Wp) of the helix flight profile 10b is measured as the extent along the second (a2) or the third axis (a3) extending perpendicular to the first axis (a1) due to the generally uniform width (Wp) of the profile about the first axis (a1). In the present examples, the width (Wp) is approximately 0.2 mm. As can be seen from FIGS. 2a to 2d, the width (Wp) may also be of a different size e.g. smaller than the height of the helix flight (Lp). Alternatively or additionally, the helix flight profile 10b may be of a different shape than rectangular, for example it may be square, elliptical or circular. A circular profile 10b of the helix structure 10 is shown in FIG. 2d. Generally, the pillar 1 comprises a larger compressive strength when the helix structure 10 has a helix flight profile 10b comprising a large width (Wp).

In the present examples, the pillars 1 are made of any non-outgassing, high strength material such as metal e.g. high strength steel. The yield stress of the material of the pillar 1 is preferably at least 1 GPa. In the present examples, if the pillars 1 are made of metal, they generally undergoes both plastically and elastically deformation during the production of the VIG unit 2 when the pillars 1 are compressed. Due to the small size of the pillars 1 and the large compressive stress exerted by the atmospheric pressure, the compressed pillars 1 only have a small amount of elasticity left, but enough elasticity for the pillars 1 to act as a spring and to maintain their assigned positions in the finished VIG unit 2 even when affected by the environment in which the VIG unit 2 is installed. Generally, the elastic energy stored in the compressed pillars 1 depends on the pillar design, pillar material and external load.

In designing the pillar, the exemplary pillars 1 shown in the figures generally have a pillar diameter (D) at the bottom contact surface 8a of the pillar 1 which is larger than the initial pre-compressed height of the pillar (L0) in order to prevent the pillars 1 from toppling over. In order to further stabilize the orientation of the pillar 1, the helix flight height (Lp) is preferably larger or equal to the height of the upper part (Lu) and the height of the lower part (Ll).

The pillars 1 can be used in the production of a VIG unit 2 by first placing them on the first glass pane 3a, whereby the second glass pane 3b is placed on top such that the pillars 1 are placed in between. The pillars 1 are in the present example shown in FIG. 5 placed on the glass pane 3a with a distance of approximately 40 mm in between them. The edges of the VIG unit 1 are sealed with proper sealing material 6 such as metal or solder glass. Upon evacuation of the void 5 between the glass panes 3a, 3b e.g. through an evacuation hole 16 in one of the glass panes 3a,3b, the glass panes 3a, 3b will move towards each other and both glass panes 3a, 3b will come in contact with the pillars 1 between them. As the glass panes 3a, 3b continuously move towards each other during the evacuation, the pillars 1 will start to be compressed and sandwiched between the glass panes 3a, 3b until the desired pressure is reached in the void 5 and the evacuation process is terminated whereby the VIG unit 2 is sealed. Hereafter the pillars 1 are used to maintain the distance between the glass panes 3a, 3b in the VIG unit 1, also in the case the distance between the glass panes 3a, 3b experience small variations in the distance due to e.g. an impact or thermal influences.

Figure 3A:
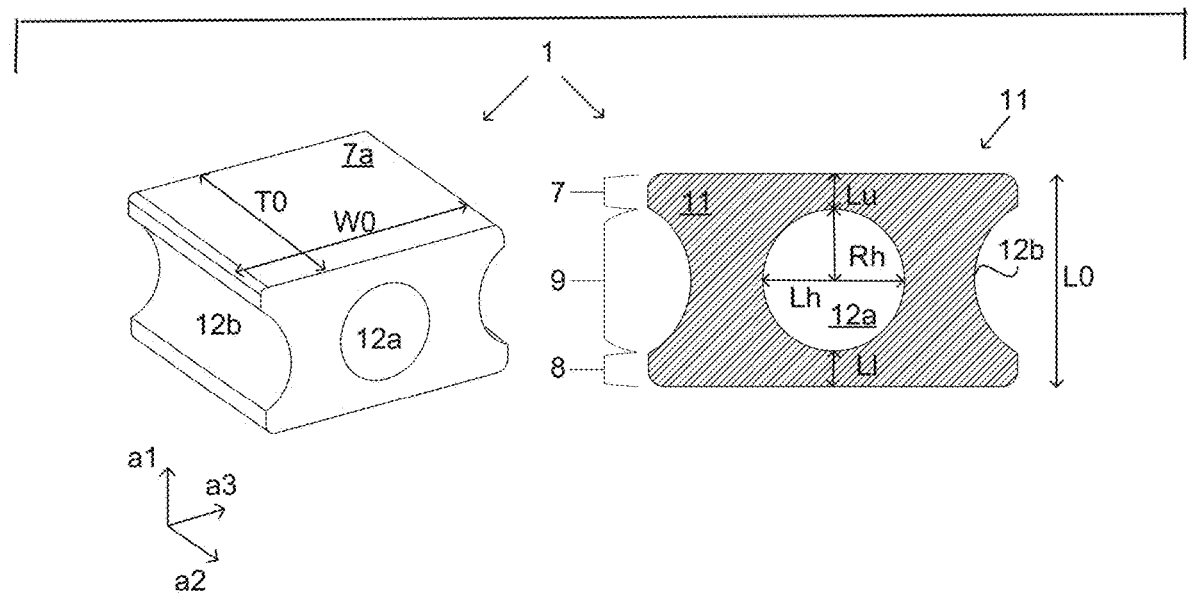
FIG. 3a illustrates a perspective view of a third pillar in the pre-compressed state.
Figure 3B:
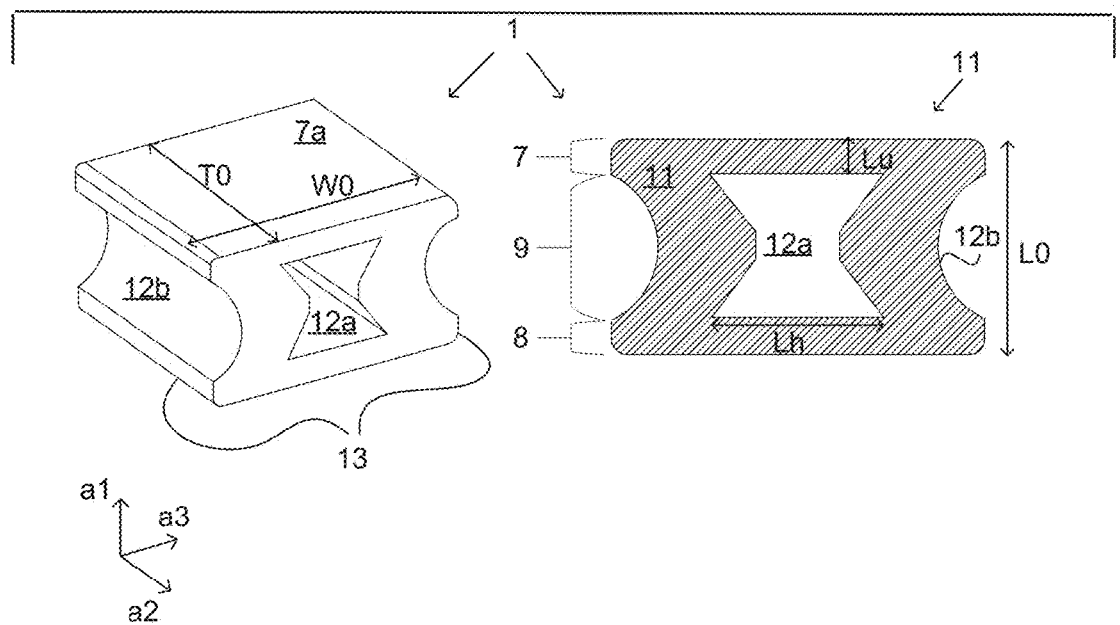
FIG. 3b illustrates a perspective view of a fourth pillar in the pre-compressed state.
Figure 4A:
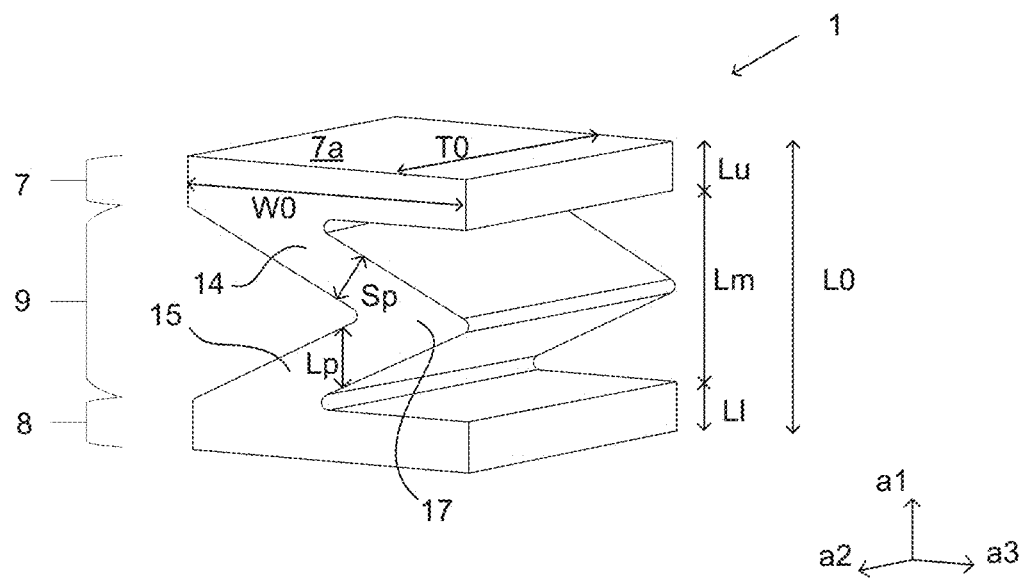
FIG. 4a shows a perspective view of a first pillar of a capital sigma shape in the pre-compressed state.

FIGS. 3a, 3b and 4a/4b/4c show three alternative designs of the pillar 1. In each example, the three-dimensional pillar 1 is shaped such that it is uniform in one direction, along the second axis (a3), in order to ease the production of the pillar 1. The examples show a pillar 1 which are to be placed in a VIG unit 2 such that they may be of a uniform in shape along in a direction substantially parallel to the glass pane surfaces 4a, 4b, when the pillar 1 is arranged in the VIG unit 2. The extent of the pillar 1 along the second axis (a2) is the pillar thickness (T0). The height of the pillar (L0), (cL), (eL), (Lmin) is measured as the largest extend from the top 7a to the bottom contact surface 8a along the first axis (a1). The width of the pillar (W0) along the third axis (a3), measured as the largest extent from a first side of the pillar 1 to a second side of the pillar 1, such as at the base of the pillar profile 11. In the present examples the pillar thickness (T0) and the pillar width (W0) are both larger than the pre-compressed pillar height (L0).

A pillar profile 11 representing a cross section of the pillar 1 defined by the first (a1) and third axis (a3) is shown in FIGS. 3a and 3b. The pillar profile 11 depicts the upper 7, middle 9 and lower part 8 of the pillar 1. Generally, the upper part 7 and the lower part 8 each comprises a contact surface 7a, 8a each arranged to be in contact with the inner surface of one of the glass panes 4a, 4b and the middle region 9, i.e. the deformable part 9 of the pillar 1 comprises two structures separately connecting the first end structure 7 and the second end structure 8 and surrounding an open zones 12 facilitating compression of the pillar 1. In FIG. 3a the open zones 12 comprise a circular hole 12a near the middle of the pillar 1 in the middle part 9 and a groove 12b at each side of the pillar profile 11 in the middle part 9. The grooves 12b have an inwardly curved shape making the pillar width (W0) near the top and the bottom of the pillar 1 larger than near the middle of the pillar 1. The radius of the hole (Rh) is between 100-120 microns and the smallest width of the profile wall (Wp), measured along the third axis (a3) from the hole 12a to the groove 12b is approximately also between 100-120 microns. Larger or smaller holes 12a and larger or smaller widths of the wall on each side of the hole 12a may also be manufactured.

FIG. 3b shows a similar design and similar configuration of the pillar 1 as the one illustrated in FIG. 3a. Instead of a circular hole 12a in the middle part 9 of the profile 11, the present profile 11 comprises a hole 12a having a more complex shape similar to two trapezoids combined by a small rectangular section at the smallest width of the trapezoids, about which rectangular middle part they are orientated in a mirror configuration. This shape results in a hole 12a having essentially eight corners. The largest width of the hole (Wh) is near the upper and lower regions of the hole 12a where the hole 12a comprises a hole width (Wh) which in the present example is between 200-240 microns wide. As in the previous example, at each side of the pillar profile 11, the pillar profile 11 comprises a groove 12b which curves inwardly, making the shape of the side of the pillar profile 11 substantially concave. The pillar profile 11 has sides which constitute two knee structures which allow compression to controllably squeeze the pillar height. While the hole 12a provides an open structure, which allows the knee structures to move.

Figure 4B:
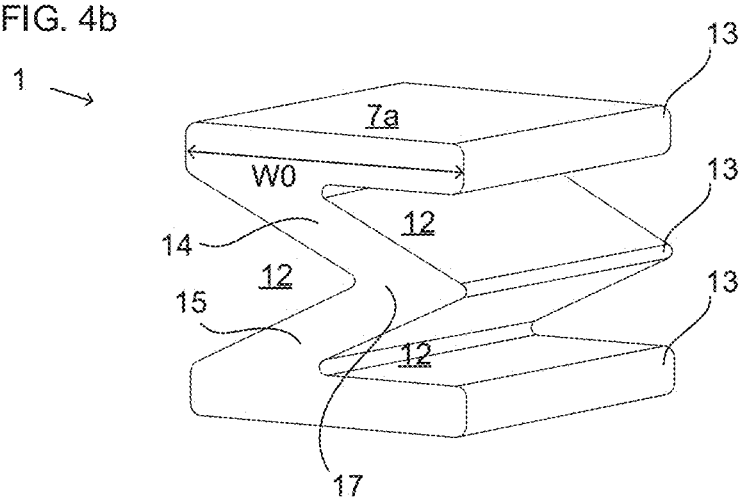
FIG. 4b shows a perspective view of a second pillar of a capital sigma shape in the pre-compressed state.
Figure 4C:
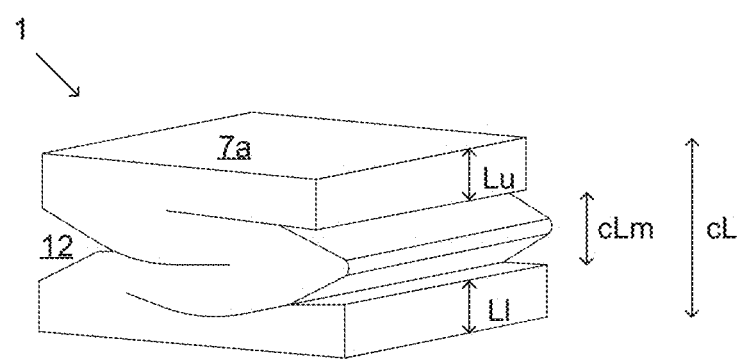
FIG. 4c illustrates the pillar of FIG. 4b in the compressed state.

FIG. 4a shows another example of a pillar 1 similar to the two previous examples but different in the sense that the present example does not have open zones 12 in form of an enclosed hole 12a. FIG. 4b shows a slightly different embodiment of the pillar 1 in FIG. 4a, where the edges have been rounded. FIG. 4c shows the compressed state of the pillar 1 as shown in FIG. 4a. In the present examples as shown in FIGS. 4a-c, the pillar 1 is substantially shaped as a capital sigma symbol (Σ), similar to the letter M rotated 90 degrees from the conventional orientation of the letter M, such that the parallel wall elements 7, 8 in the M-shaped pillar are each arranged in parallel with extent of the surfaces of the first and/or second glass pane 4a, 4b when the pillar 1 is arranged in the VIG unit 2. The parallel wall elements 7, 8 comprise the upper contact surface 7a and lower contact surfaces 8a. A first element 14 of the middle part 9 of the pillar 1 extends from the first parallel wall element 7 at a slanted angle to the longitudinal direction a1 of the pillar towards the second parallel element 8 and a second element 15 extends from the second parallel element 8 at a second slanted angle to the longitudinal direction a1 towards the first parallel wall element 7, where the first and the second slanted angles being of substantially the same magnitude but of opposite directions. The first element 14 and the second element 15 of the middle part 9 of the pillar 1 are jointed in a joining part 17 of the middle part 9 of the pillar 1. The present profile design comprises open zones 12 between the wall elements 7, 8, 14, 15 of the pillar 1. In the present example, the initial pre-compressed pillar height (L0) is approximately 400 microns while the pillar thickness (T0) is approximately 460 microns measured along the second axis (a2). The pillar width (W0) measured along the third axis (a3) is also approximately 460 microns. The pillar profile 11 has central portion 9 which constitutes a knee structure which allow compression to controllably squeeze the pillar height.

In one or more examples, the top and bottom contact surfaces 7a, 8a, which are arranged to face the inner glass pane surface 4a, 4b, are substantially planar in order to facilitate a good and uniform contact with the glass panes 3a, 3b. The height of each upper (Lu) and lower part (Ll) is in the present example approximately 70 microns, measured along a line perpendicular to the contact surface of the pillar profile structure to the open zone, which in the present example is generally along a line parallel with the first axis (a1). In the present example, the compressible middle part 9 is the V-shaped part of the M-shaped design of the pillar 1 and comprises a wall size (Sp) of approximately 75 microns, measured as the width of the wall 14, 15 along a line perpendicular to the outlines of the V-shaped wall structure for the present structure. In another example the height of each upper (Lu) and lower part (Ll) are approximately 100 microns and the compressible middle part 9 comprises a wall size (Sp) of approximately 80 microns. In this example, the initial pillar height (L0) is approximately 400 microns while the pillar width (W0) is approximately 300 microns, and the pillar thickness (T0) is approximately 480 microns. Naturally, at positions where the upper 7, middle 9 and lower parts 8 forming the sigma-structure are joined the height and width may be larger or smaller, e.g. for the V-shaped part of the sigma structure, the height at the point where the two linear elements 14, 15 of the V-shape are joined the wall height (Lp) is up to approximately 200 microns when measured along the first axis (a1) for the present example. Additionally, the width of the wall (Wp), measured along the third axis (a3) is also larger at this position.

The middle part 9 is compressible such that as pressure is applied on the contact surfaces 7a, 8a of the pillar 1, the contact surfaces 7a, 8a are forced towards each other, preferably along the first axis (a1) and the middle part 9 compresses and experiences a reduction in height (cLm), resulting in an overall reduction of the pillar height (ΔL, red). During compression the occurrence of open zones 12 will decrease, an example of this is shown in FIG. 4c. In the present examples, the pillar 1 is shown before (FIG. 4a and FIG. 4b) and after (FIG. 4c) compression the pillar height is decreased from the initial pillar height (L0) of 400 microns to a compressed pillar height (cL) of 235 microns, while still maintaining small amount of elastic energy, such that when the force is released on the pillar the longitudinal extent of the pillar may increase to an expanded longitudinal extent (ΔL, exp). As the pillar 1 is compressed it is compressed over itself thereby increasing its stiffness and stability under atmospheric pressure.

Generally, the pillar structure may comprise chamfered edges 13 e.g. in order to degrease the occurrence of a sharp contact between the contact surfaces of the upper part 7a and the lower part 8a and the inner glass surface 4a, 4b of the glass panes. This in turn decreases the possibility of indention related damage on the glass. An example of a chamfered pillar structure is shown in FIG. 4b.

Figure 5A:
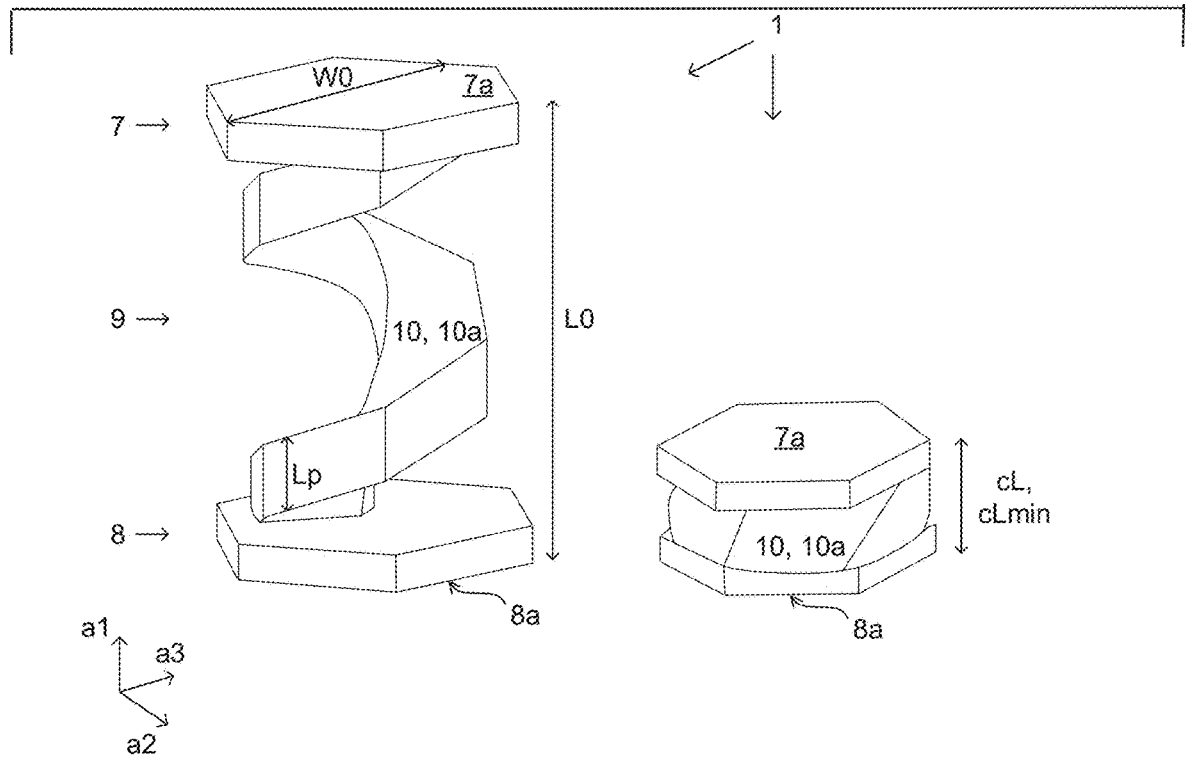
FIG. 5a is a perspective view of a further pillar comprising a coil-shaped deformable middle part in the pre-compressed state as well as in the compressed state.

A further embodiment of a pillar 1 comprising a coil-shaped deformable middle part 9 is shown in FIG. 5a in the pre-compressed state as well as in the compressed state. This pillar 1 deviates from the ones shown in FIGS. 1a to 1g in that the upper part 7 of the pillar 1 as well as the lower part 8 of the pillar 1 are of a hexagonal shape and the deformable middle part 9 of a helix structure 10 will be of a corresponding hexagonal shape when compressed as shown to the right in FIG. 5a.

Figure 5B:
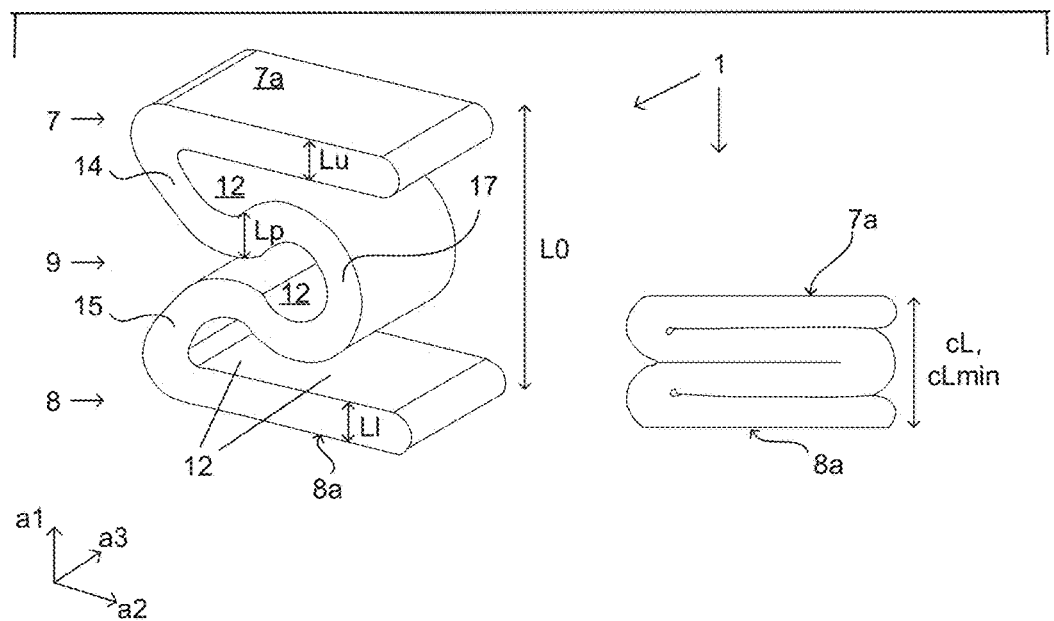
FIG. 5b shows a perspective view of a third pillar of a capital sigma shape in the pre-compressed state as well as in the compressed state.
Figure 6:
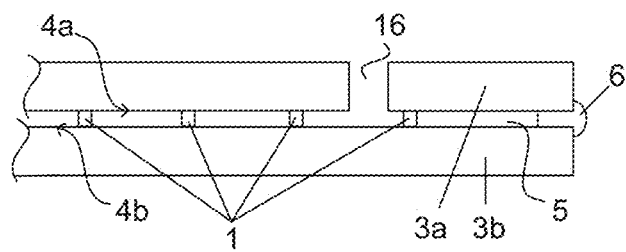
FIG. 6 shows a VIG-unit.

A third embodiment of a pillar 1 of a capital sigma shape is shown in FIG. 5b. The difference between this embodiment and the ones shown in FIGS. 4a-4c is that the first and second elements 14, 15 of the deformable middle part 9 of the pillar 1 has a more curved transition to the two parallel end structures 7, 8 of the pillar 1, the upper part 7 and the lower part 8, and that the joining part 17 connecting the ends of first and second elements 14, 15 are formed with a partly annularly cross-section with a curved transition to the first and second elements. Thus, the sharper edges and transitions between the various parts 7, 8, 14, 15, 17 of the capital sigma shaped pillar 1 of FIGS. 4a and 4b have been replaced with curved transitions in the third embodiment of FIG. 5b, which appear to provide a pillar 1 having a suitable plastic deformation response when subjected to compression force in the longitudinal direction of the pillar 1. The wall thickness of the middle part 9 of this embodiment, i.e. of the first and second elements 14, 15 and of the joining part 17 is in one embodiment thereof about 80 microns and the overall height L0 of the pillar 1 prior to compression thereof is about 600 microns with a lowest compressed height cLmin of about 317 microns. However, the pillar 1 according to this third embodiment of a capital sigma shape may be designed with other wall thicknesses and heights.

Figure 7:
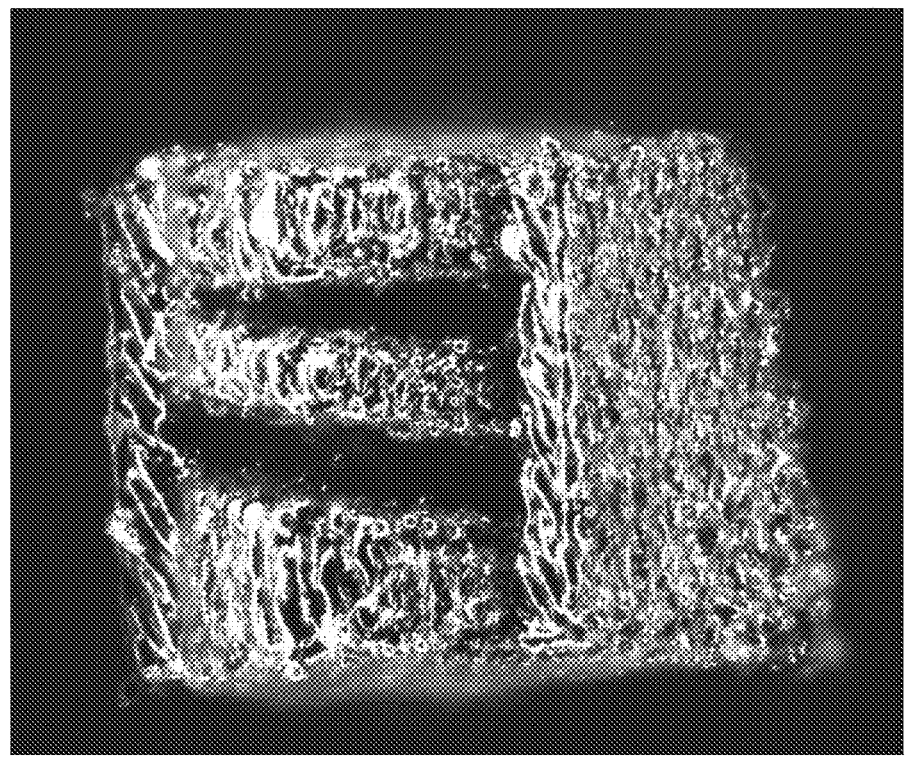
FIG. 7 illustrates the pillar of FIGS. 1a-g in the pre-compressed state.

FIG. 7 shows an image of a pillar structure similar to the pillar structure shown in FIGS. 1a-g. The image is a microscopic image of an actual pillar 1 manufactured to dimensions as given according to the present invention. The pillar 1 shows an upper part 7, middle part 9 and a lower part 8, where the middle part 9 comprises a coil-shaped structure 10 having open zones 12 which can become increasingly smaller as pressure is applied to the pillar 1 from above or below at the upper contact surface 7a or the lower contact surface 8a.

FIGS. 8a-c shows the pillar structure as shown in FIG. 7, at three different stages of compression. The first figure, FIG. 8a, shows a pre-compressed pillar structure with a coils shaped middle part 9. As compression force is applied to the structure along a direction perpendicular to the upper 7a and lower contact surfaces 8a the coil-shaped middle part 9 compresses and the open zones 12 between wall elements of the structure are decreased in size until they are almost completely eliminated due to further compression as shown in FIG. 8c. The height of the pillar structure in FIG. 8c is given the expanded longitudinal extent of the pillar when the compression force on the pillar is lifted (eL).

Figure 9A:
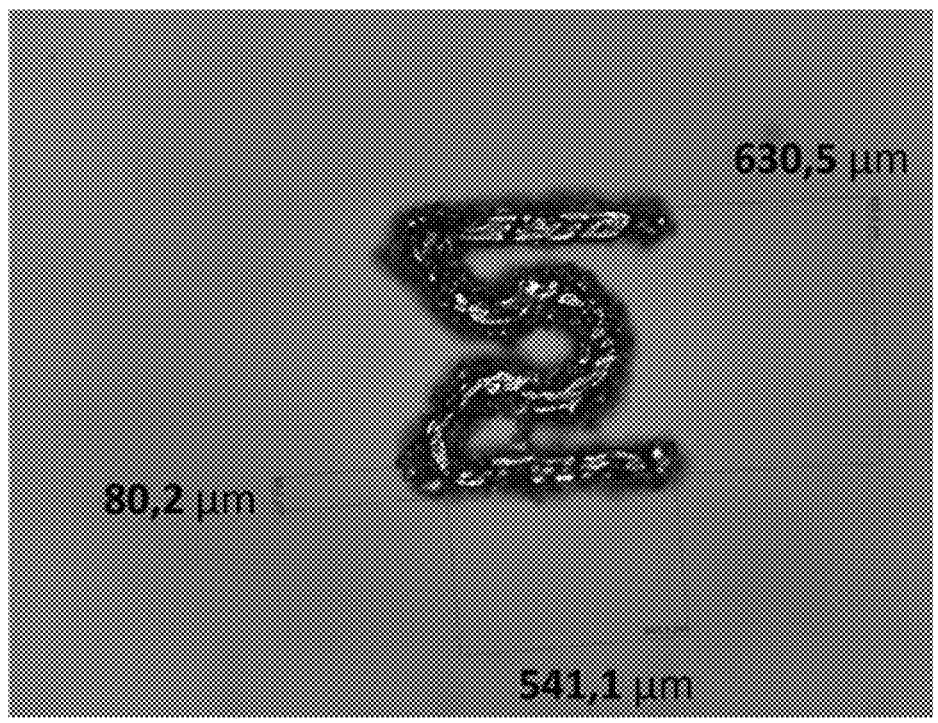
FIG. 9a is a scanning electron microscope (SEM) picture of a sample of a pillar of the type shown in FIG. 5b.
Figure 9B:
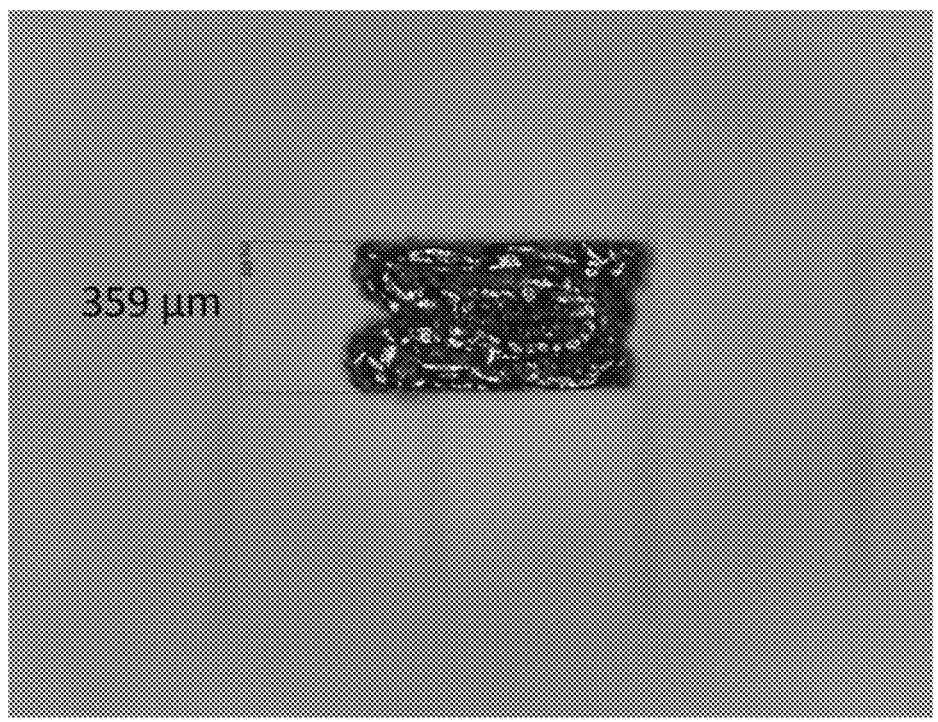
FIG. 9b is a SEM picture of the pillar of FIG. 9a after a compression force has been applied to the longitudinal direction of the pillar and subsequently has been lifted.
Figure 9C:
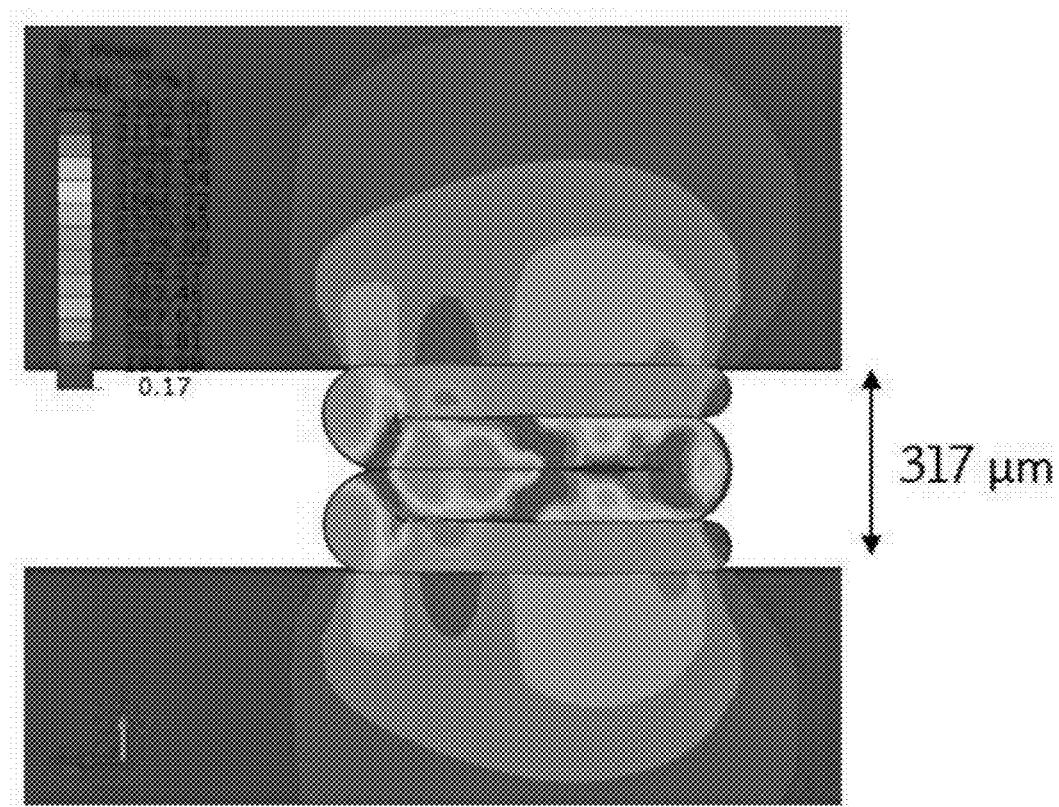
FIG. 9c shows a model simulation of the type and size of a pillar shown in FIGS. 9a and b with a compression force applied.

A scanning electron microscope (SEM) picture of a sample of a pillar 1 of the type shown in FIG. 5b can be found in FIG. 9a. The actual longitudinal extent L0 of the uncompressed pillar is measured to 930.5 µm, the width W0 of the bottom contact surface 8a is measured to 541.1 µm, whereas the height Ll of the lower part 8 of the pillar 1 is measured to 80.2 µm. In FIG. 9b, a SEM picture of the pillar 1 is shown after a compression force F has been applied to the longitudinal direction of the pillar and subsequently has been lifted. The longitudinal extent eL of the pillar 1 has in this situation been measured to 359 µm. The compression force F was equivalent to the compression force exerted on pillars with a mutual spacing of 40 mm by an atmospheric outer pressure and a pressure in the void being neglectable, so that the compression force F is of a magnitude of about 160 N. A model simulation of the same type and size of a pillar 1 is shown in FIG. 9c with a compression force of 160 N applied and the longitudinal extent cL of the pillar in the compressed stated is computed to be 317 µm. The numbers from FIGS. 9b and 9c provides an indication that the pillar 1 will expand about 42 µm ΔL, exp in its longitudinal direction when said compression force F is lifted which constitutes about 13% of the reduction of 313 µm in the longitudinal extend of the pillar when the compression force F is applied to the pillar and which would also constitute about 13% of the relative reduction in the longitudinal extend of the pillar. Thus, it is indicated that the pillar when the compression force is lifted has a relative expansion in the longitudinal direction of the pillar of 13% of the relative reduction of the longitudinal extend of the pillar caused by the application of the compression force F.

Figure 10A:
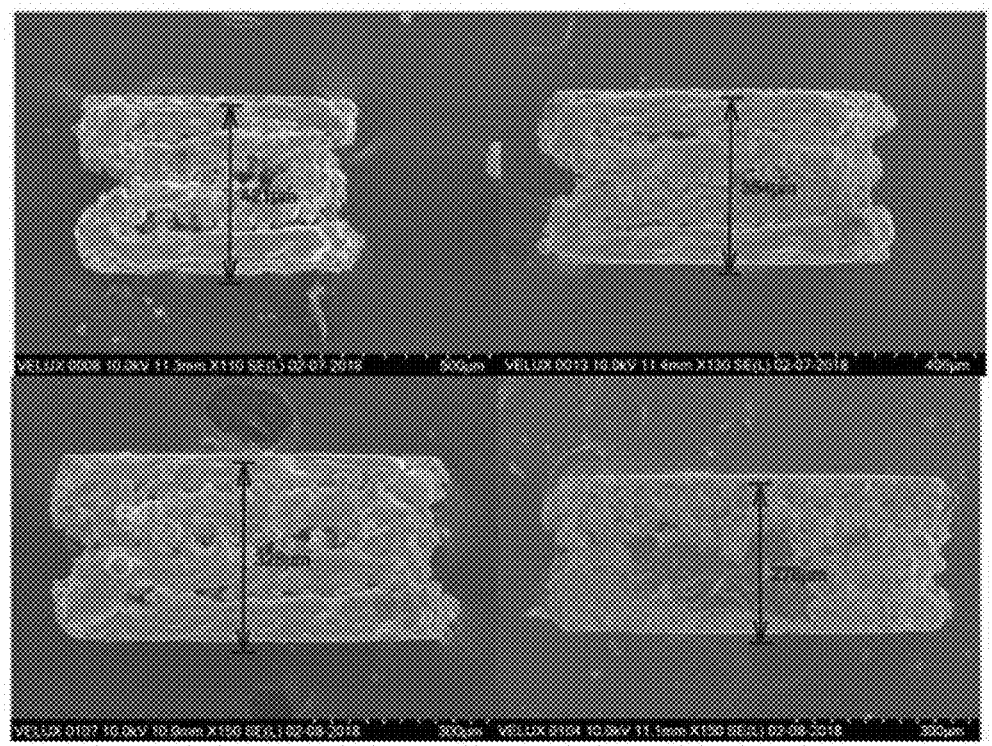
FIG. 10a shows SEM pictures of four examples of compressed pillars.
Figure 10B:
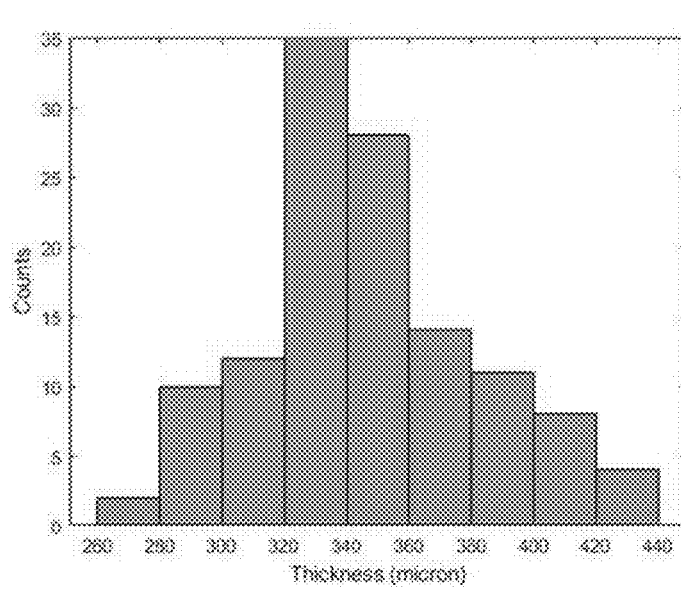
FIG. 10b is a histogram of the longitudinal extent eL of 124 pillars.

A test of 140 pillar of the type shown in FIG. 5a and FIG. 9a was conducted, where the pillars 1 were used to manufacture a VIG-unit using a mutual spacing of the pillars of 40 mm. The panes were made from thermally tempered glass, wherein the tempering has caused a deviation of the surface of the panes from absolute plane surfaces, known as roller waves or roller wave distortion. Thus, the distance between the two panes prior to the evacuation of the void differed for each individual pillar which caused the pillars to be subjected to different compression forces upon evacuation of the void. After the evacuation of the void, the VIG-unit was taken apart and the pillars were collected. Of the original 140 pillars, 137 were collected. Of these, 11 pillars had been toppled on the side prior to evacuation of the void so that the compression has not been applied in the longitudinal direction of the pillars. Furthermore, 2 pillars were not in a state so that they could be measured. The longitudinal extent eL of the remaining 124 pillars were measured by means of SEM and four examples are shown in FIG. 10a, where the measured expanded longitudinal extents of the pillars 1 after the compression force F has been lifted are 278 µm, 328 µm, 354 µm and 421 µm, respectively, which exemplifies the consequence of varying compression forces F being applied to the individual pillars due to roller waves of the thermally tempered panes. In FIG. 10b a histogram of the longitudinal extent eL (in the figure caption called Thickness) of the 124 pillars.

In one or more examples, the pillar 1 can generally comprise two parts joined together, a first part being a more compressible part and a second part being a more solid part (not shown). One part is in contact with the first glass pane 3a while the second part is in contact with the second glass pane 3b.

The pillars 1 according to the present invention may be homogeneous with respect to material, i.e. being manufactured in one material only, preferably a metal. Alternatively, the pillars 1 may be manufactured as bi-layer structures with one material for the first and second end structures 7, 8 and a second material for the deformable middle part 9 of the pillar 1. In yet another embodiment, the pillars 1 may comprise a tri-layer structure, where the contact area between the end structures 7, 8 and the middle part 9 of the pillar 1 is manufactured in a third material that is suitable to bridge the differences in mechanical material properties between the material used for the first and second end structures and the material used for the middle part 9 of the pillar 1.

Parts or components of the pillars 1 may be manufactured in a ceramic material, in particular the first and the second end parts 7, 8.

The contact surfaces 7a, 8a of the pillars 1, i.e. the first and the second end surfaces, may receive a coating in order to prevent shear forces between these surfaces 7a, 8a and the inner surfaces 4a, 4b of the two glass panes 3a, 3b of the VIG-unit 2 from causing damages to the glass panes 3a, 3b. The shear forces may arise from temperature related deformations of the glass panes 3a, 3b or from wind loads and physical impacts on the exterior sides of the glass panes 3a, 3b. The coating serves to promote a physical displacement between the contact surfaces 7a, 8a of the pillars 1 and the inner surfaces 4a, 4b of the two glass panes 3a, 3b and may include a lubricant such as a thin silver layer and/or molybdenum disulfide.

The invention claimed is:

1. A process of manufacturing of a compressible pillar for the preparation of a vacuum insulated glazing (VIG) unit, wherein the compressible pillar has a longitudinal extent in the pre-compressed state and comprising a deformable part having an open structure, which open structure will at least partially collapse when the pillar is subject to a compression force acting in the longitudinal direction of the pillar, the compression force being of at least one value selected within the range of 60 N to 320 N, the pillar will exhibit a partly irreversible deformation causing a reduction in the longitudinal extent of the pillar when the pillar is subjected to said compression force, so that when said compression force is fully released the pillar will exhibit an expansion in the longitudinal direction of the pillar which is less that said reduction in the longitudinal extent of the pillar and wherein the process comprises applying an additive manufacturing technology to a metal powder bed by means of selective employment of laser light to fuse particles of the metal powder.

2. The process according to claim 1, wherein the compression force is being of at least one value selected within the range of 140 N to 230 N.

3. The process according to claim 1, wherein the fusion of particles includes the melting of particles.

4. The process according to claim 1, wherein the fusion of particles includes the sintering of particles.

5. The process according to claim 1, wherein the fusion of the particles of the metal powder is conducted repetitively to consecutive layers of the metal powder.

6. The process according to claim 1, comprising the step of providing the pillar with a first end structure and a second end structure having a first and a second substantially plane end surface, respectively, for abutting with the glass panes of the VIG-unit, which end surfaces extend substantially in parallel, wherein the first end structure and the second end structure each has an extent in the longitudinal direction of the pillar in the range of 0.025 to 0.1 mm.

7. The process according to claim 6, wherein the first end structure and the second end structure each has an extent in the longitudinal direction of the pillar in the range of 0.04 to 0.075 mm.

8. The process according to claim 6, wherein the first end structure and the second end structure are processed after the additive manufacturing technology has been applied to obtain said extent in the longitudinal direction of the pillar.

9. The process according to claim 1, wherein the pillar comprises a first end structure and a second end structure having a first and a second substantially plane end surface, respectively, for abutting with the glass panes of the VIG-unit, which end surfaces extend substantially in parallel,
   wherein the deformable part of the pillar connects the first end structure and the second end structure, and
   wherein the pillar is formed with a substantially uniform cross-section in parallel planes perpendicular to the first and the second end surfaces.

10. The process according to claim 9, wherein the deformable part comprises a first element extending from the first end structure towards the second end structure at a first slanted angle to the longitudinal direction of the pillar and a second element extending from the second end structure towards the first end structure at a second slanted angle to the longitudinal direction of the pillar, the first and the second slanted angles being of substantially the same magnitude so that the first element and the second element are slanted in opposite directions.

11. The process according to claim 10, wherein the first element and the second element of the deformable part of the pillar are joined in a joining part of the deformable part, wherein the joining part is formed with a partly annular cross-section with a curved transition to the first and second elements.

12. The process according to claim 9, wherein the deformable part of the pillar comprises two structures separately connecting the first end structure and the second end structure.

13. The process according to claim 1, wherein the pillar, when said compression force is released, will expand in the longitudinal direction of the pillar with a relative expansion in the longitudinal direction of the pillar in the range of 0.5% to 50% of the relative reduction.

14. The process according to claim 1, wherein the relative reduction in the longitudinal extent of the pillar, when the pillar is subjected to said compression force to being equal to a compression factor times the compression force, the compression factor being in the range of $0.8 \cdot 10^{-3} N^{-1}$ to $5.0 \cdot 10^{-3} N^{-1}$.

15. The process according to claim 1, wherein said open structure of the pillar is made from metal.

16. The process according to claim 15, wherein the metal is an austenitic nickel-chromium-based superalloy.

17. The process according to claim 15, wherein said metal has compressive yield strength higher than 1 GPa at 20° C.

18. The process according to claim 1, wherein the open structure of the pillar is formed so that the first end structure and the second end structure will be mutually displaces towards each other substantially only in the longitudinal direction of the pillar when the pillar is subjected to said compression force acting in the longitudinal direction of the pillar.

19. A method of producing a vacuum insulated glazing (VIG) unit comprising the steps of:
providing a first and second substantially parallel panes of glass and a plurality of compressible pillars manufactured by a process according to claim 1 provided between the first and second panes to ensure a minimum distance between the panes,
forming a void between the first and the second panes and a peripheral seal, and
evacuating the void whereby the pillars are compressed between the first and the second pane.

20. A vacuum insulated glazing (VIG) unit comprising
a first and second substantially parallel panes of glass and a plurality of compressible pillars provided between the first and second panes, the pillars being compressed between the first and the second pane, wherein the compressible pillar is manufactured using a process according to claim 1,
a void formed between the first and the second panes and a peripheral seal, wherein the void is evacuated.

* * * * *